July 26, 1949. P. FARKAS 2,477,173
TWO-STROKE INTERNAL-COMBUSTION ENGINE
Filed May 27, 1946 4 Sheets-Sheet 3
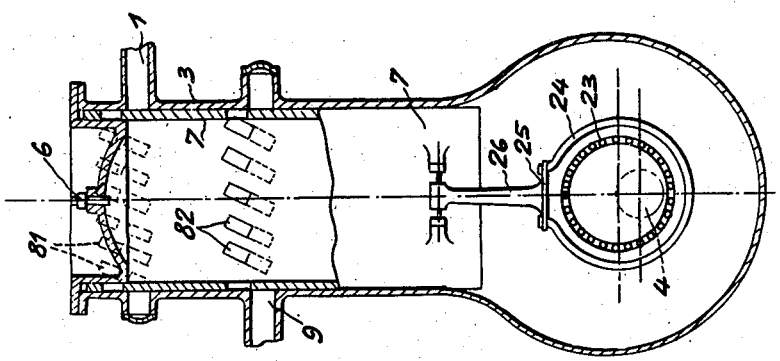
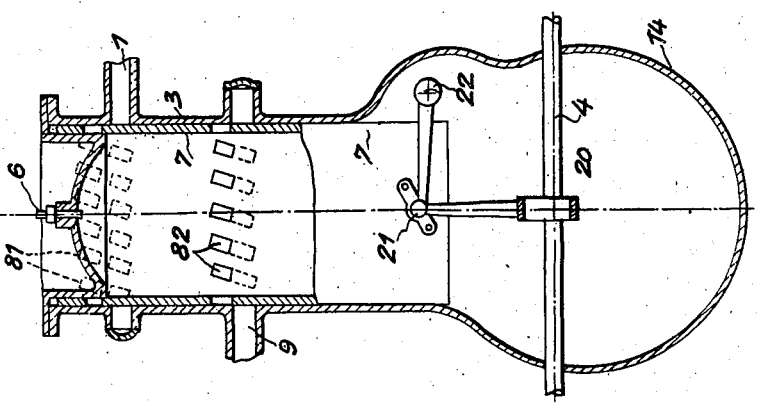
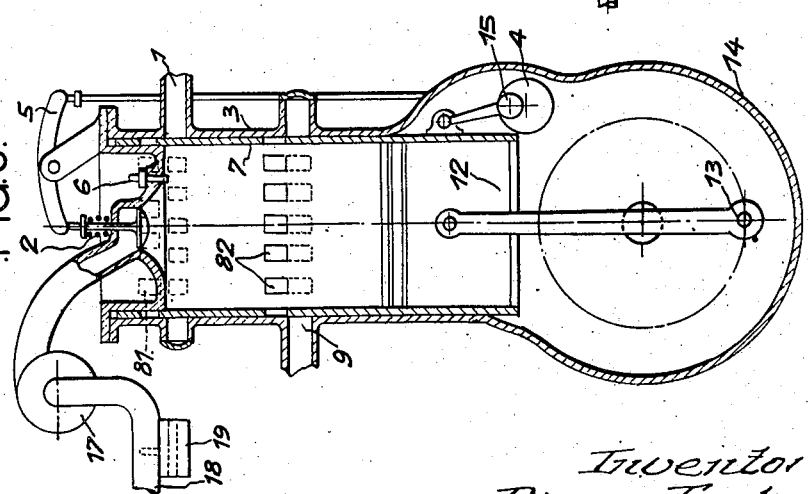
Inventor
Pierre Farkas

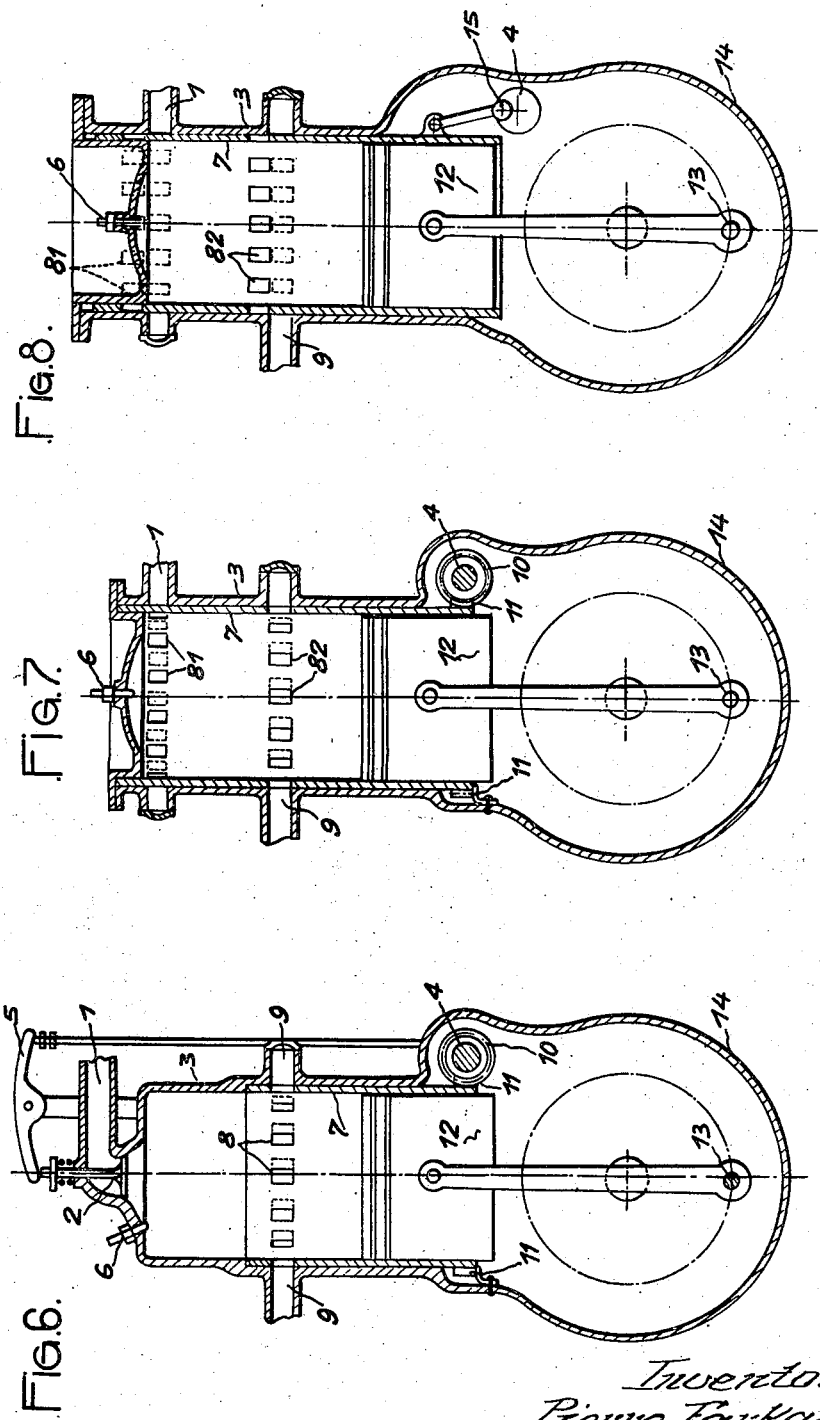

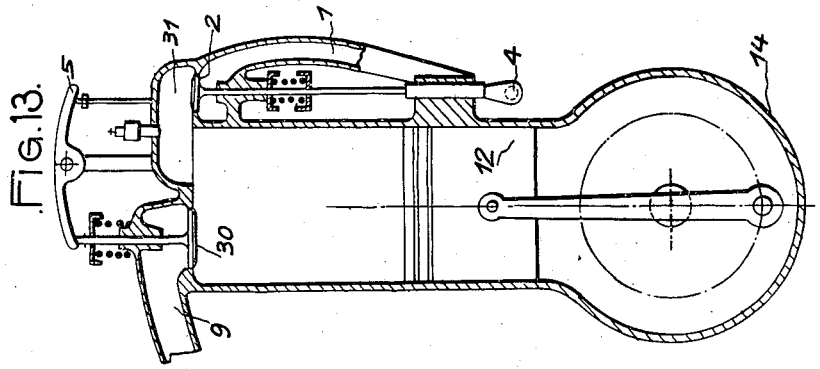
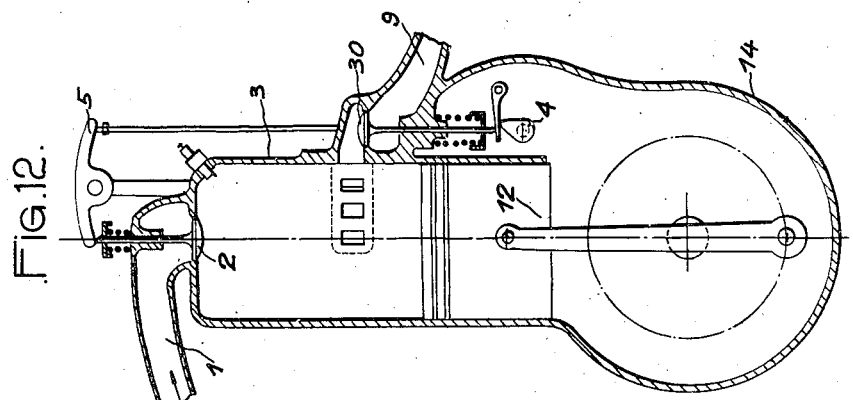
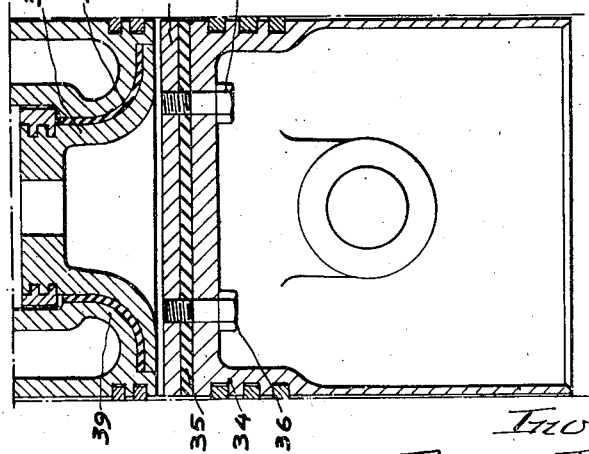

UNITED STATES PATENT OFFICE 2,477,173

TWO-STROKE INTERNAL-COMBUSTION ENGINE

Pierre Farkas, Paris, France

Application May 27, 1946, Serial No. 672,518
In France August 10, 1940

Section 1, Public Law 690, August 8, 1946
Patent expires August 10, 1960

4 Claims. (Cl. 123—65)

In spite of the interest which it offers from the point of view of its light weight and of the simplicity of its construction and from the point of view of the power the two stroke cycle internal combustion engine is used presently only for a small power. As a matter of fact it has a certain number of disadvantages which in their whole entail losses of efficiency which are cause that the four stroke cycle engine is preferred in spite of its comparatively high weight and of the greater complexity of its construction.

The cycle of the known two stroke cycle engines is represented in Figs. 1 and 2 of the appended drawing which are respectively an approximative diagram of the cycle and the corresponding diagram obtained by plotting the volumes as abscissae and the pressures as ordinates.

On said Figs. 1 and 2 the following reference letters designate:

H—upper dead centre
B—lower dead centre
OE—exhaust opening
FE—exhaust closing
OA—admission opening
FA—admission closing One easily sees from Fig. 1 which represents the normal two stroke cycle that the expansion period H—OE (hachured region) is substantially equal to the exhaust period OE—FE and to the compression period FE—H.

Thus, this expansion period has a comparatively small value.

This small value of the expansion entails a loss of power for the engine. As a matter of fact, the pressure at the point OE (Fig. 2) is comparatively very higher than the atmospheric pressure. The sudden pressure fall OE—OA results in a loss of power and an exhaust noise.

Furthermore, the small value of the expansion increases the mixture of the fresh carburetted gases (in the case of an engine with a carburetter) with the burnt gas the removal of which is to be insured by the fresh gas.

Finally, the closing FA before the closing FE permits, on the beginning of the compression, to obtain only a pressure of carburetted gas near the atmospheric pressure, the final pressure thus always remaining substantially the same. It is thus not possible to control neither the initial nor the final pressure.

One has already attempted to prolong the expansion in the cycle of the two stroke cycle engines but the very conditions of operation of the conventional two stroke cycle engine do not lend themselves well to the prolonged expansion; indeed, since the four operations: the admission, the compression, the expansion and the exhaust must take place during a complete stroke of the piston, the expansion operation is necessarily limited; the universally employed solution consists in omitting the admission and exhaust strokes which led to insure a substantially equal value to the three following phases of the engine working: expansion, admission, compression. The so obtained approximative value of 120° for the expansion is still decidedly insufficient for insuring an economical and fully satisfactory working to the two stroke cycle engine and, more particularly, to the explosion engine.

The present invention has for its object to avoid the preceding disadvantages; it relates to a method for controlling the cycle of a two stroke cycle engine characterized by the fact that the exhaust is opened short before the passage of the piston through the lower dead centre, the exhaust being closed about 90° after this passage, the admission being opened in the neighbourhood of the lower dead centre of the piston and after the opening of the exhaust the admission is closed after the closing of the exhaust and before the passage of the piston through the upper dead centre, which permits to obtain a cycle with a very prolonged expansion which is extended, for instance, up to a value of 170°, the driving stroke of the engine being used to its extreme limit, said method thus resulting in a substantial reduction of the counter-pressure during the compression phase, which increases the power developed by the engine for a predetermined mass of fuel.

This method results clearly from Figs. 3 and 4 which are respectively a diagram of the cycle and the corresponding working diagram. (In Figs. 3 and 4 and in Figs. 1 and 2 the same reference letters have been used for designating the same phases of the cycle.)

The opening OE (Fig. 3) is effected short before the point B; it is followed by the opening OA which takes place short after the point B, the closing FE taking place substantially at 90° from B and being followed by the closing of FA.

The length of the expansion H—OE (hachured region) considerably exceeds that of the compression. This single stroke of the engine is used until the maximum value allowed for by the stroke of the piston.

The magnitude of the scavenging is entirely maintained; this value OE—FE is necessary in order that the scavenging may be complete.

The closing FA takes place after the closing FE and before the point H.

The compression of the carburetted gas or of the air is shown by the sector FA—H; this compression extends over a sector which is considerably smaller than that of the expansion H—OE; the compression stroke is largely diminished with respect to that of the conventional two and four stroke cycle engines.

At the opening OE (Fig. 4) since the pressure of the burnt mixture is only slightly higher than the atmospheric pressure the major part of the pressure has thus been received by the piston under the form of power.

At the opening OE said pressure suddenly falls below the atmospheric pressure for rising again at the opening OA after the passage of the piston through the point B.

Then the pressure keeps a value which is slightly higher than the atmospheric pressure until the closing FE.

Beyond this point it is possible, through an action exerted upon the feeding of the engine (opening of the throttle of the carburetter or intake of air from the compressor) to adjust the final compression degree of the engine and, accordingly, its working conditions; indeed, by reducing the feeding to a minimum one will, at point FA, obtain a starting pressure for the carburretted gas or the air near the atmospheric pressure which pressure will be brought by the rising of the piston to a predetermined value corresponding to the minimum rate of the engine; on the contrary, by insuring the maximum feeding the starting pressure, at the point FA will already be decidedly higher than the atmospheric pressure and it will be brought by the rising of the piston to a value corresponding to the maximum rate of the engine.

For facilitating the comparison between the known cycle (Fig. 2) and the new cycle (Fig. 4) both cycles have been superposed in Fig. 5.

In the known cycle the pressure in the expansion stroke is higher than the corresponding pressure in the new cycle; this results to the benefit of the known cycle in an increase measured by the area with simple hatchings.

On the contrary, in the known cycle the pressure during the compression phase is higher than the corresponding pressure in the new cycle; this results to the benefit of the new cycle in an increase measured by the areas with crossed hatchings.

Fig. 5 shows immediately that the areas with crossed hatchings are larger than the area with simple hatchings; accordingly the new cycle offers with respect to the known cycle a larger area and, therefore, a higher efficiency while using a smaller quantity of fuel since FA—H (Fig. 3) is considerably reduced with respect to FE—H (Fig. 1).

According to the invention, one can vary the relative magnitude and position of the opening times of the admission and exhaust organs according to various conditions such as the speed of rotation of the engine, its dimensions, the fuel which is used, the number of cylinders which are employed and the like, the expansion time being always prolonged until a practically maximum value near 170°.

In definitive, the method according to the invention makes it possible to obtain numerous advantages and more particularly the following ones:

1. The prolonged expansion which extends substantially on the whole downward stroke of the piston offers the advantage that the driving stroke of the cycle is used until its extreme limit which results in an important increase of the power and efficiency of the engine.

2. The final pressure of the burnt gases is comparatively small at the moment of the exhaust opening without it being possible, however, to attain the atmospheric pressure owing to the high temperature of said gases. This small pressure reduces in a large measure the tendency of the gases to mix with the fresh gases which are admitted and intended to remove them in a carburetter engine.

3. The burnt gases product only light detonations in the exhaust which makes the engine more noiseless and avoids the device required for lessening the noisy explosions of the usual two stroke cycle engines in the exhaust.

4. The closure of the admission after the closure of the exhaust makes it possible to control the working of the engine through a simple action on the fuel feeding device of the engine.

5. One can vary the position FA which makes it possible to increase or reduce the end of the compression according to the requirements.

The invention covers the above mentioned method itself and the engines working according to this method irrespectively of the mechanical arrangements which are chosen.

The invention also covers certain mechanical features which will be described in the following and their various combinations.

Further objects and advantages of my invention will be apparent from the description and claims.

In the drawing, in which an embodiment of my invention is illustrated:

Figs. 6 to 11 are diagrammatical vertical sectional views showing six two stroke cycle engines made according to the invention.

Figs. 12 and 13 are two diagrammatical vertical sectional views showing two other engines made according to the invention.

Fig. 14 illustrates a further feature of the invention.

Figure 1:
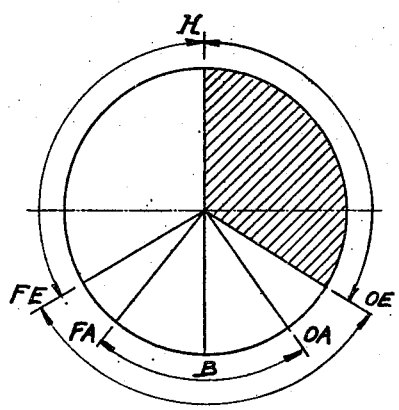
Fig. 1 is a diagram of the operating cycle of a motor in accordance with the prior art.

The two stroke cycle engine according to Fig. 6 comprises an air admission conduit 1 controlled by a valve 2 arranged at the top of the working cylinder 3 and actuated by the cam shaft 4 through the medium of a rocker 5. An injector 6 injects the liquid fuel into the combustion chamber in injection engines or a conventional sparking plug inflames the carburetted gases which have been compressed by the piston.

The organ which controls the exhaust is formed of a rotary sleeve 7 with side ports 8 corresponding to exhaust ports 9 provided half-way up the height in the cylinder. The rotation of the sleeve 7 is insured by a mechanism comprising a worm 10 and a toothed crown wheel 11.

A piston 12 sliding in the sleeve 7 is mounted on a crankshaft 13 rotating in the crank-case 14.

Said engine is adjusted so that the ports 8 of the rotary sleeve 7 uncover the ports 9 only in the neighbourhood of the lower dead centre of the piston 12; thus a prolonged expansion is obtained as explained with reference to Figs. 3 and 4.

Figure 3:
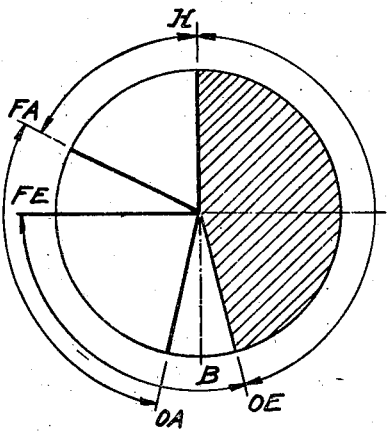
Fig. 3 is a diagram of the operating cycle by a motor according to the invention.
Figure 2:
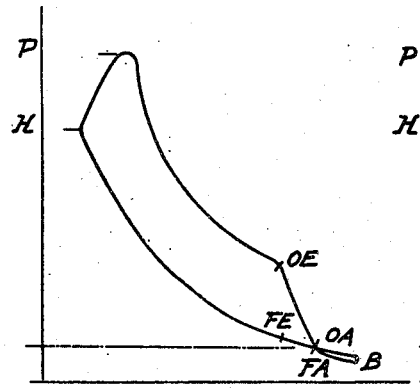
Fig. 2 is a corresponding diagram obtained by plotting the volumes as abscissae and the pressures as ordinates.
Figure 4:
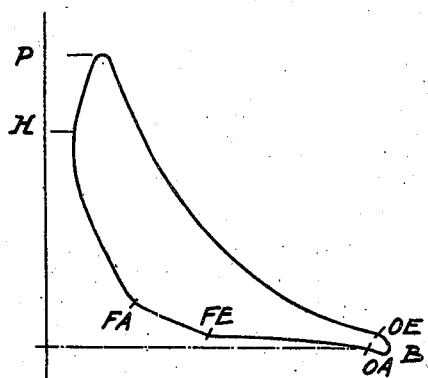
Fig. 4 is a corresponding diagram obtained by plotting the volumes as abscissae and the pressures as ordinates.
Figure 5:
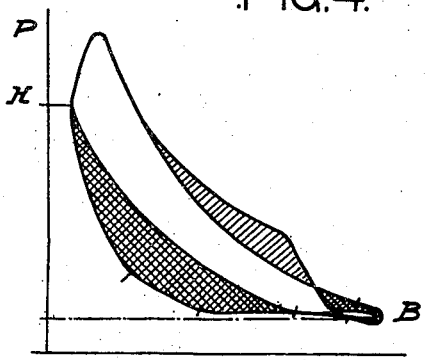
Fig. 5 shows a diagram comprising the curves of both Figs. 2 and 4 which are superposed to facilitate their comparison.

The openings and closings of the sleeve 7 and of the valve 2 are controlled so as to produce a working according the cycle of Fig. 3 and to offer the already explained advantages; it is more particularly the piston 12 itself which in its upward stroke closes the exhaust ports.

The two stroke cycle engine according to Fig. 7 differs from that of Fig. 6 by the fact that the rotating sleeve 7 is provided with two series of side ports 81—82; the upper ports 81 insures the admission of the combustion air while the lower series 82 insures the escape of the burnt gases. This arrangement makes it possible to obtain the cycle according to Fig. 3 by means of a single organ (rotary sleeve 7) insuring both the admission and the exhaust which simplifies the construction.

The two stroke cycle engine according to Fig. 8 differs from that of Fig. 7 in that the sleeve 7 instead of rotating about its axis, axially slides in the cylinder 3. To this end said sleeve is actuated by means of an eccentric 15 mounted on the cam shaft 4. Thus, this sliding sleeve controls the openings 1 for the air of combustion and the openings 9 for the exhaust of the burnt gases so as to produce the working according to the cycle of Fig. 3.

Fig. 9 shows another two stroke cycle engine made according to the invention and adapted for permitting the injection of petrol in the state of a mist. Said engine is like that shown in Fig. 8; however, a compressor 17 draws in through an air-hose 18 into which the nozzle of a carburetter 19 opens. The so obtained very rich gaseous mixture is distributed in the upper part of the cylinder 7 through an admission valve 2 actuated by the rocker 5; this very rich gaseous mixture is added to the air admitted into the cylinder by the ports 81 and thus forms a mixture in suitable proportions for the combustion.

The controls of the sleeve 7 and of the valve 2 are adjusted so that the cycle according to Fig. 3 is still obtained here.

This arrangement makes it possible to admit the fuel mixture after the closing of the air admission ports 1, which avoids every loss of fuel mixture and thus facilitates the accurate measuring of very volatile fuels such as petrol.

This arrangement makes it also possible to feed a multi-cylinder engine with a single compressor 17.

Finally, said arrangement makes it possible to feed the engine with a gaseous fuel by means of a pump and a compressed gas reservoir.

The two stroke cycle engines which have been described above by way of example comprise the ones a rotary sleeve (Figs. 6 and 7) and the others a sliding sleeve (Figs. 8 and 9). In the modification shown in Fig. 10 the sleeve receives both an axially sliding motion and a partial movement of rotation about its axis so that said sleeve 7 controls the openings of the cylinder while facilitating the lubrication and avoiding the sticking of piston rings more particularly in the case of heavy oil engines.

Indeed, the sleeve through its rotary movement shifts the piston rings in their grooves which avoids any sticking of said rings.

A form of execution of this engine is shown in Fig. 10. The engine which in its whole is like that shown in Fig. 8 comprises a sleeve 7 with two series of openings 81—82; said sleeve is actuated by a cam 20 mounted on the shaft 4; to this end the cam 20 actuates a ball 21 inserted in a recess provided in the sleeve 7 and mounted at the end of a rocking lever swinging about a fixed axis 22; thus the sleeve receives a complex motion resulting from a rotation and an axial translation which insures the above indicated advantages.

Another form of execution is shown in Fig. 11. An eccentric 23 mounted on the cam shaft 4 rotates in a strap 24. An axis 25 is mounted in the flanges of said strap; a connecting rod 26 is linked on said axis and connected, on the other hand, with the sleeve 7 by an axis 27. Thus the strap 24 receives a plying movement which it transmits to the sleeve 7. The sleeve 7 can also be provided with ports which permit the admission of the fuel gas after the closing of the ports for the admission of the scavenging air.

The engine according to Fig. 12 differs from the preceding ones in that it comprises a valve 2 which controls the admission and a valve 30 which controls the exhaust branch pipe. Both said valves 2—30 are actuated by the cam shaft 4, the one through the medium of rocking shafts 5 and the other directly.

The adjustment of the opening and of the closing of the admission and of the exhaust is insured so that the cycle of Fig. 3 is still obtained here.

In the engine of Fig. 13 the admission 1 controlled by the valve 2 and the exhaust 9 controlled by the valve 30 are both arranged at the top of the engine, the admission conduit 1 opening into a combustion chamber 31. Said engine is arranged so that its crank case 14 forms an air precompression chamber and also supplies the admission conduit 1 with compressed air.

In view to maintain a high temperature in the combustion chamber, which is more particularly useful in injection engines self-ignition, isolating material is provided on the inner surface of the cylinder head and/or on the piston, so as to avoid the heat emission. Thus, Fig. 14 shows an asbestos gasket 35 secured to the piston 34 by means of screws 36 under a plate 40, for instance of steel. Furthermore, an asbestos plate 37 is also arranged between two parts 38, 39 of the cylinder head. These joints prevent the heat emission from the piston and the cylinder head. The isolation may also be performed otherwise without departing from the spirit of the invention.

Further modifications will be apparent to those skilled in the art and it is desired, therefore, that the invention be limited only by the prior art and the scope of the appended claims.

Having thus described my invention, what I claim and desire to secure by Letters Patent is:

1. A two-stroke cycle internal combustion engine comprising a cylinder including an intake and an exhaust, a piston in said cylinder, means for expanding the contents of said cylinder to drive said piston when the latter is at its upper dead center, means for opening said exhaust after an expansion in the neighborhood of 170° and adjacent to but before passing the lower dead center of said piston and for closing said exhaust at least 90° from its opening, and means for opening the intake after the piston has passed lower dead center but adjacent thereto and for closing said intake after the closing of said exhaust and before the piston again reaches upper dead center, whereby to increase the efficiency of said engine by providing a prolonged expansion and a substantial reduction in the counter pressure during the compression phase which increases the energy developed for a predetermined amount of fuel.

2. A two-stroke internal combustion engine comprising a cylinder including an intake and an exhaust, a piston in said cylinder, means for expanding the contents of said cylinder to drive said piston when the latter is at its upper dead center, means for opening said exhaust after an expansion in the neighborhood of 170° and adjacent to but before passing the lower dead center of said piston and for closing said exhaust at least 90° from its opening, and means for opening the intake after the piston has passed lower dead center but adjacent thereto and for closing said intake after the closing of said exhaust and before the piston again reaches upper dead center, said intake and said exhaust comprising each a series of openings in said cylinder, said cylinder, said means for opening and closing said exhaust and said means for opening and closing said intake comprising a sliding and rotating sleeve between said cylinder and said piston and having two series of ports, one for each series of openings in said cylinder, and further comprising a cam shaft, an eccentric on said shaft, a strap around said eccentric, a rod and means pivotally connecting said rod to said strap and to said sleeve, whereby to increase the efficiency of said engine by providing a prolonged expansion and a substantial reduction in the counterpressure during the compression phase which increases the energy developed for a predetermined amount of fuel.

3. A two-stroke cycle internal combustion engine comprising a cylinder including an intake and an exhaust, a piston in said cylinder, means for expanding the contents of said cylinder to drive said piston when the latter is at its upper dead center, means for opening said exhaust after an expansion in the neighborhood of 170° and adjacent to but before passing the lower dead center of said piston and for closing said exhaust at least 90° from its opening, means for opening the intake after the piston has passed lower dead center but adjacent thereto and for closing said intake after the closing of said exhaust and before the piston again reaches upper dead center, heat insulating means on the piston and a rigid plate overlying said means and secured to said piston.

4. A two-stroke cycle internal combustion engine comprising a cylinder having a two-part head, a piston, heat insulating means on the piston between the parts of the cylinder head, and a rigid plate overlying said means on said piston and secured thereto.

PIERRE FARKAS.

REFERENCES CITED

The following references are of record in the file of this patent:

UNITED STATES PATENTS

| Number | Name | Date |
| --- | --- | --- |
| 1,503,184 | Burtnett | July 29, 1924 |
| 1,508,099 | Hawley | Sept. 9, 1924 |
| 1,656,316 | Burtnett | Jan. 17, 1928 |
| 1,661,738 | Rymer | Mar. 6, 1928 |
| 2,065,600 | Meyer | Dec. 29, 1936 |
| 2,134,286 | Kipfer | Oct. 25, 1938 |

FOREIGN PATENTS

| Number | Country | Date |
| --- | --- | --- |
| 344,967 | France | 1904 |
| 641,326 | France | 1928 |
| 688,850 | France | 1930 |
| 357,519 | Great Britain | 1931 |